(12) United States Patent
Zaslavsky et al.

(10) Patent No.: US 11,514,008 B2
(45) Date of Patent: Nov. 29, 2022

(54) DYNAMICALLY CONTROLLING DATA MIGRATION

(71) Applicant: salesforce.com, inc., San Francisco, CA (US)

(72) Inventors: Ilya Zaslavsky, Toronto (CA); Ping Yun, Falls Church, VA (US); Raksha Subramanyam, Fremont, CA (US)

(73) Assignee: SALESFORCE, INC., San Francisco, CA (US)

( * ) Notice: Subject to any disclaimer, the term of this patent is extended or adjusted under 35 U.S.C. 154(b) by 146 days.

(21) Appl. No.: 16/591,249

(22) Filed: Oct. 2, 2019

(65) Prior Publication Data
US 2021/0103568 A1    Apr. 8, 2021

(51) Int. Cl.
| | |
|---|---|
| *G06F 16/21* | (2019.01) |
| *G06F 16/27* | (2019.01) |
| *G06F 9/50* | (2006.01) |
| *G06F 11/30* | (2006.01) |
| *G06F 11/14* | (2006.01) |

(52) U.S. Cl.
CPC .......... *G06F 16/214* (2019.01); *G06F 9/5038* (2013.01); *G06F 11/1448* (2013.01); *G06F 11/3006* (2013.01); *G06F 16/27* (2019.01)

(58) Field of Classification Search
CPC ...... G06F 16/214; G06F 16/27; G06F 9/5038; G06F 11/1448; G06F 11/3006
USPC ........................................................ 707/634
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |

(Continued)

*Primary Examiner* — Tony Mahmoudi
*Assistant Examiner* — Kamal K Dewan
(74) *Attorney, Agent, or Firm* — Schwabe Williamson & Wyatt

(57) ABSTRACT

Migration results in specific action requests to move data from a source system instance to a target system instance. Migration may consume many resources. In an effort to monitor migration effects on source and/or target performance, one or more traffic lights are determined to monitor utilization of resources of the source and/or target. Based on the one or more traffic lights, migration is dynamically throttled. The one or more traffic light may be assigned a status based on how the migration affects performance of another data operation which may be contemporaneously operating on either the source and/or the target.

20 Claims, 6 Drawing Sheets

(56) References Cited

U.S. PATENT DOCUMENTS

| | | |
|---|---|---|
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,747,720 B1 | 8/2020 | Birdsall |
| 10,776,147 B2 | 9/2020 | Oversea et al. |
| 10,817,497 B2 | 10/2020 | Zaslavsky et al. |
| 10,897,405 B2 | 1/2021 | Subramanyam |
| 10,924,334 B1 | 2/2021 | Kumar et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0086516 A1* | 4/2008 | Claborn .............. G06F 11/2094 |
| 2008/0183689 A1 | 7/2008 | Kubota |
| 2008/0249972 A1 | 10/2008 | Dillon |
| 2009/0063415 A1 | 3/2009 | Chatfield et al. |

(56) References Cited

U.S. PATENT DOCUMENTS

| | | | |
|---|---|---|---|
| 2009/0100342 A1 | 4/2009 | Jakobson | |
| 2009/0177744 A1 | 7/2009 | Marlow et al. | |
| 2011/0218958 A1 | 9/2011 | Warshavsky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0006920 A1 | 1/2013 | Kreindler | |
| 2013/0085998 A1* | 4/2013 | Barker | G06F 9/455 707/649 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0149591 A1* | 5/2014 | Bhattacharya | G06F 9/5072 709/226 |
| 2014/0359537 A1 | 12/2014 | Jackobson et al. | |
| 2015/0120659 A1 | 4/2015 | Srivastava | |
| 2016/0078068 A1 | 3/2016 | Agrawal | |
| 2016/0246821 A1 | 8/2016 | Meder | |
| 2017/0212817 A1* | 7/2017 | Srivastava | G06F 11/14 |
| 2017/0337813 A1 | 11/2017 | Taylor | |
| 2017/0346751 A1 | 11/2017 | Barnes | |
| 2018/0074915 A1* | 3/2018 | Yang | G06F 16/273 |
| 2018/0095838 A1* | 4/2018 | Kono | G06F 3/0617 |
| 2018/0246928 A1* | 8/2018 | Kim | G06F 11/1474 |
| 2018/0246945 A1* | 8/2018 | Lee | G06F 11/3433 |
| 2019/0001135 A1 | 1/2019 | Yoo | |
| 2019/0042609 A1* | 2/2019 | Senthilnathan | G06F 16/22 |
| 2019/0095297 A1* | 3/2019 | Neall | G06F 11/2082 |
| 2019/0235918 A1 | 8/2019 | Liu et al. | |
| 2019/0236159 A1 | 8/2019 | Subramanyam et al. | |
| 2020/0364194 A1* | 11/2020 | Rao | G06F 9/45558 |
| 2020/0403921 A1* | 12/2020 | Thanasekaran | G06F 3/0659 |
| 2020/0409339 A1* | 12/2020 | Arashanipalai | G06F 16/906 |
| 2021/0021653 A1* | 1/2021 | Mercier | H04L 67/1095 |
| 2021/0055717 A1 | 2/2021 | Tucker | |
| 2021/0103567 A1 | 4/2021 | Zaslavsky et al. | |

\* cited by examiner

DYNAMICALLY CONTROLLING DATA MIGRATION

TECHNICAL FIELD

The present invention relates generally to organization migrations, and in particular, to dynamic flow control of a migration based on predicted impact the migration may have on a contemporaneous operation or service.

BACKGROUND

A large-scale cloud-based computer system may include multiple datacenters at various geographic locations to maintain millions of sets of application data for millions of organizations as well as provide millions of sets of application services such as those for customer relationship management, secured data access, online transaction processing, mobile apps, etc., to respective users and/or customers of these organizations. As datacenters grow and evolve over time, and as computing resource needs for the organizations evolve over time (e.g., a need for faster resources, or geographic needs change), some organizations may be migrated or relocated between computing instances of a same datacenter and/or different datacenters.

Organization migration may be manually performed with human supervision by, e.g., experts experienced in various aspects relating to migrating application data and application services in the data centers. However, for some organizations, a migration may represent an enormous resource cost in expert time and availability, rendering human supervision inefficient, error prone, and ultimately risking migration failure(s). Automation may be employed to automatically migrate an organization, however migration may interfere with other ongoing operations, for example, the Data Guard service which creates a copy (exact or logical) of a database.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
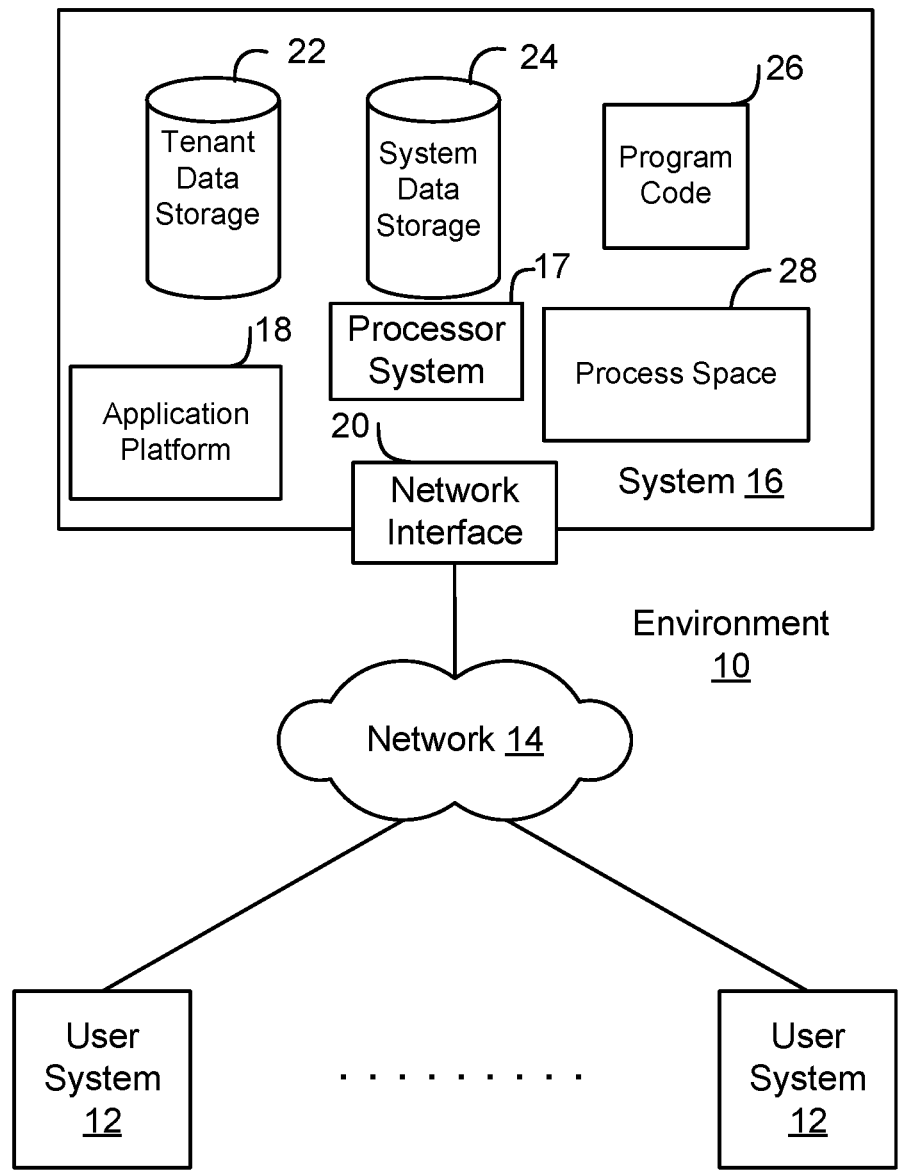
FIG. 1A shows a block diagram of an example environment in which an on-demand database service can be used according to some implementations.

The following detailed description discusses multiple exemplary embodiments for more efficiently migrating an organization. It will be appreciated while various alternatives are disclosed, they are approaches that may be pursued, but none are approaches that necessarily must be used. In addition, while issues with solutions may be identified with respect to one or more exemplary approaches described herein, none should be assumed to have been recognized in any prior art on the basis of being identified as a known issue. In this description, for the purposes of explanation, numerous specific details are set forth in order to provide a thorough understanding of the present invention. It will be apparent, however, the present invention may be practiced without these specific details. In other instances, well-known structures and devices are not described in exhaustive detail, in order to avoid unnecessarily occluding, obscuring, or obfuscating the present invention.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

The following is a brief overview of selected features of various embodiments. This overview is not an extensive summary of the invention or claimed embodiments, is not intended to identify particularly significant aspects of disclosed embodiments, and does not delineate any particular scope of the invention. This overview merely presents some concepts that may facilitate, in a condensed and simplified format, understanding more detailed description below and appreciate the breadth of the claimed embodiments.

If we assume a first primary database is being migrated to a second primary database, and both databases are protected by a service such as Data Guard, to minimize interference by the migration on, for example, the second primary database, a traffic light may be used to throttle the migration if there is sufficient interference to the Data Guard service of the second primary database. It will be appreciated there may be many different database operations and services active at any given time on either the first or second primary database, and Data Guard is but one exemplary service that benefits from the teachings herein. A traffic light based on IO Traffic Light may be used to monitor Data Guard, however, this traffic light often inefficiently throttles operation. For example, during a migration, we may identify, for example, high Data Guard apply lag times relating to the second primary database, at least in part because the IO Traffic Light is seeing IO relating to the migration and may unnecessarily stop the Data Guard activity when instead it would be more efficient to dynamically throttle the speed of the migration.

To better appreciate this, we need to briefly discuss migrating an organization, in which application data and/or application services of an organization (or tenant) are moved from a source system instance of a computing system to a target system instance of the computing system. A migration user (operator, administrator, authorized user, designated user, etc.) requesting and monitoring organization migration (s), can send or issue a request for the organization migration, for example through a web portal or an organization migration web page, to a migration scheduler. Operational parameters of the organization migration and/or migration configuration data at least a part of which may be carried/embedded within the request and at least a part of which may be collected from the source and target system instances can be validated by the migration scheduler. The migration scheduler can interact with a migration orchestration engine to carry out multiple scheduled organization migrations within a selected time window, such as to have migration occur within a relatively short downtime window.

Examples of migration schedulers can be found in U.S. patent application Ser. No. 15/882,194 ("Scheduling Framework For Organization Migrations") by Liu, et al. Examples of migration orchestration engines can be found in U.S. patent application Ser. No. 15/882,233 ("Orchestration Engine") by Ovesea et al. Examples of migration flow control can be found in U.S. patent application Ser. No. 15/882,266 ("Migration Flow Control") by Zaslaysky et al. It will be appreciated the principles and teachings of these filings (Ser. Nos. 15/882,194; 15/882,233; 15/882,266) may be applied as context for the present disclosure, and are hereby incorporated herein by reference in their entirety for all purposes.

Organization migrations move some or all of a hosted organization efficiently, automatically, and accurately, with little or no human intervention. Access to application data and application services in a to-be-migrated organization may be temporarily unavailable and/or limited. Organizations or tenants hosted in the source system instances and/or the target system instance, which are not being migrated, are unaffected and typically unaware of migration activity. After organization migration, the application data and the application service of the organization are no longer provided from the source system instance, and now the target system instance hosts the application data and the application services of the organization and provides computing resources to the organization.

Organization migrations are attempted to be performed efficiently with flow control, to avoid overloading, which could negatively impact migrations through too many retries, too frequent stop-and-go, etc. If system, application, network and database resources are available in the system instances, organization migrations may be continually, automatically, and/or manually scheduled and performed. In various embodiments, a "traffic light" may be used to perform flow control during a migration. It will be appreciated a traffic light may monitor many different resources of a system, application, network, and database, to generate traffic light statuses affecting flow control. Resources may be measured individually, or in combination, and in the context of a migration, measure resources of either one of both of a migration source and migration target (e.g., a system instance), including one or more characteristics/status of application nodes, database nodes, SANs, other resources, etc.

Based on resource utilization, the traffic light may change state to control (throttle) data flow in the migration between, for example, the first primary database (source system) and the second primary database (target system). In one embodiment, a concurrency controller(s) may operate with a migration scheduler(s) and a migration orchestration engine(s) to perform flow control and/or or congestion control of migration specific actions or operations to be performed for organization migrations. Instead of inducing overload conditions on the target system instance, the concurrency controller(s) may determine traffic lights to monitor resource utilization of the target system instance based on responses from the target system instance, which may include monitoring status relating to the Data Guard service for the second primary database (target system). The traffic lights for resource utilization may be used by the source system instance (or associated migration application servers) to dynamically adjust concurrency limits, which effectively constrains threads or messages to request the target system instance to perform, e.g., it slows down the migration if needed. A feedback loop between the target system (e.g., in a target POD) back to the source system (e.g., in a source POD) to obtain resource utilization information of the target system and in turn may be used to adjust the traffic light and dynamically modify the amount of migration traffic sent to the target system instance.

Traffic lights may be used by a source system instances to make flow control decisions depending on specific resource considerations as discussed above. Traffic light accuracy and/or efficiency may be impacted by a migration. For example, the Data Guard service, provided by Oracle, may be indirectly throttled with an IO Traffic Light used to monitor data production used in the replication of a primary database to a standby database. Using this traffic light can be problematic as it is a metric protecting multiple resources (Data Guard Lag and Storage Health) which in practice have different optimal throttle thresholds. The Data Guard service is described, for example, at Internet Uniform Resource Locator (URL) docs. oracle.com/cd/B19306_01/server.102/b14239/concepts.htm (to assist with print formatting and prevent inadvertent hyperlinks, spaces were added to the preceding URL). Briefly, the Oracle Data Guard service provides data availability, protection, and disaster recovery by creating and maintaining a standby database copy of a primary database. A standby database may take over if the primary database becomes unavailable for any reason. Data Guard may be used with traditional backup, restoration, and cluster techniques to provide a high level of data protection and data availability. Data Guard is intended to be transparent to use of a database, hence a migration event for a database may occur for a database protected by Data Guard. That is, the first primary database (e.g., in a first POD) may be replicated by Data Guard to a first standby database even though the first primary database is also being migrated to a second primary database (e.g., in a second POD) that itself may be replicated with Data Guard to a second standby database.

During a migration, a first primary database is generating new data for which redo data is prepared that is to be applied to a first standby database associated with the first primary database, and the first primary database is being migrated to a second primary database. Data Guard operating with respect to the second primary database is in turn receiving redo data that is to be applied to a second standby database associated with the second primary database. In an environment using migration techniques that dynamically scales resources and throughput as needed based on the status of various traffic lights, it is important traffic lights measure resources relevant to occurring activity. For example, traffic lights monitor processor, disk, memory, and other resources during a migration from a first primary database to a second primary database. Previously, the traffic lights did not monitor operation of services such as Data Guard and therefore will not recognize if Data Guard experiences a large lag time.

This may result in various problems. For example, when using the Data Guard service, resource usage may appear to exceed one or more thresholds, and the IO Traffic Light may indicate a stop condition and unnecessarily throttle data generation at the first primary database (and hence throttle the Data Guard service) more than needed. This issue is further complicated by PODs having different hardware configurations making traffic light metrics inapplicable across different POD configurations since a threshold on one POD may not be a problem on another POD. Another problem may occur if the IO Traffic Light determines migration is going smoothly and it may allow the first primary database to operate un-throttled. This may result in a large amount of redo data received by Data Guard for the second primary database that overwhelms Data Guard and results in a large Data Guard lag time.

To assist with effective throttling during a migration, status of Data Guard (or other service) is incorporated into throttling decisions made, for example, for the primary database data generation. In various embodiments new traffic lights are proposed to determine when to throttle migration of a primary database (which may be in a first POD) to a secondary database (which may be in a second POD) based on how migration is affecting the Data Guard apply lag, e.g., the lag time in performing replication of a primary database to a standby database. It will be appreciated the new traffic lights may throttle based on the effect to either the first primary database to its corresponding standby database, and/or to the second primary database to its standby database. The new traffic lights may indicate, for example, RED (stop), YELLOW (slow-down), or GREEN (un-throttled), and be used to control continuing to generate redo data for a monitored primary database. If GREEN, Data Guard is operating well and migration may process normally. If YELLOW, this means Data Guard is starting to lag behind applying redo data versus the generation of the data, and when this occurs, migration may be slowed down (e.g., by slowing data production at the first primary database) to unburden Data Guard activity. If RED, this means Data Guard is too far behind and migration needs to be slowed or stopped until Data Guard can catch up.

In various embodiments, characteristics of the Data Guard service may be used to determine whether and when to adjust operation of the migration. In various embodiments, throttling migration may be dynamically responsive to the monitored characteristics. And while Data Guard is presented as an exemplary monitored service, other services may be monitored for effects from migration. In one embodiment, a prediction of whether Data Guard apply lag has or appears to be trending to pass a threshold may be used at least in part to set a status on a traffic light. In another embodiment, in addition to, or in lieu of, a prediction of catch Data Guard catch-up time needed to complete queued-up redo operations associated with the Data Guard service is used at least in part to set the traffic light status. It will be appreciated various modifications to disclosed embodiments, principles, and features herein may be apparent to one skilled in the art. Thus, this disclosure is not intended to be limited to the embodiments shown, but is to be accorded the widest scope consistent with the described principles and features.

FIG. 1A shows a block diagram of an example of an environment 10 in which the effects of migration on database services, such as Data Guard, may be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
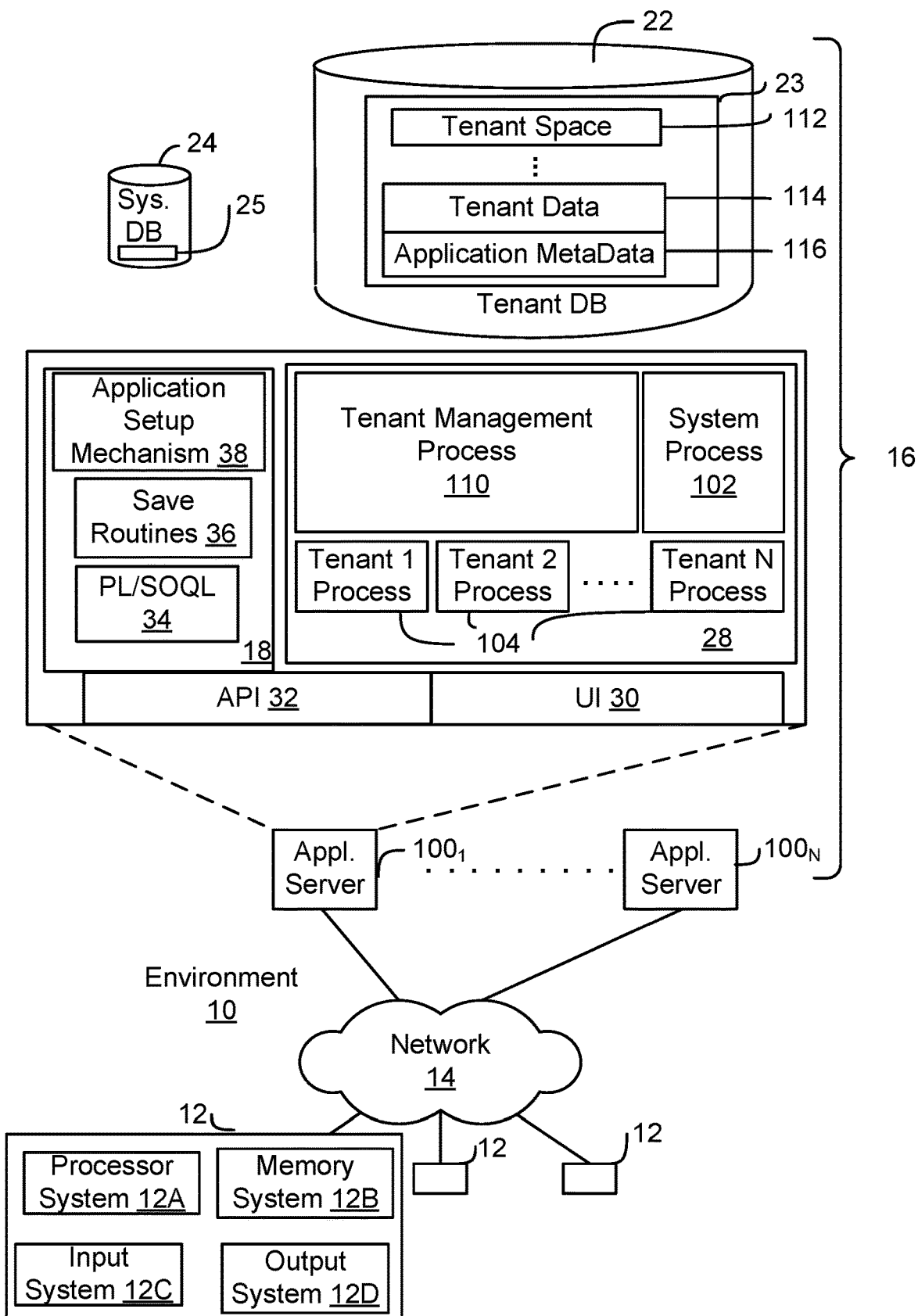
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 100₁-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 100₁ can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
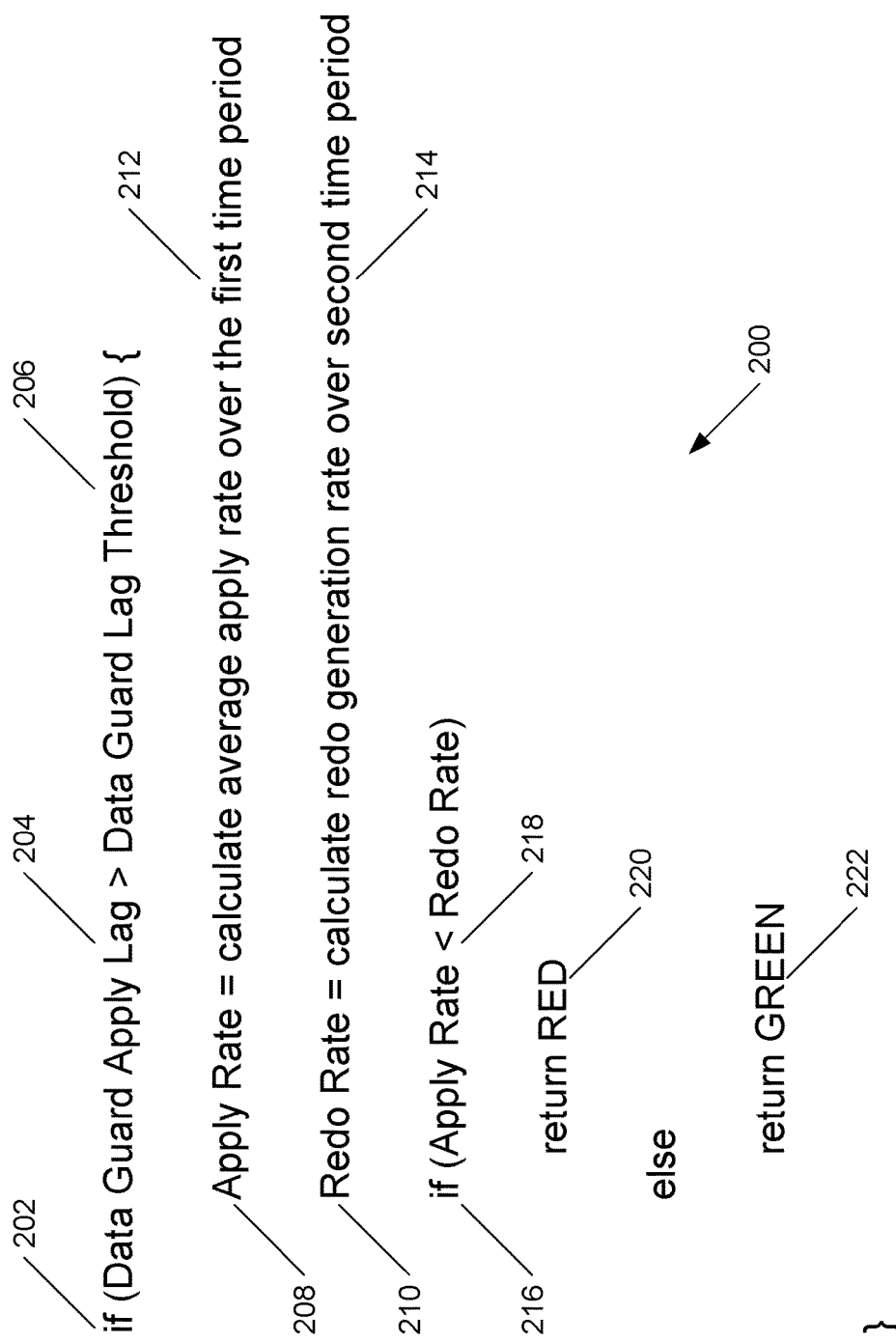
FIG. 2 illustrates exemplary pseudo-code, according to one embodiment, for setting a traffic light status based on an apply lag prediction.

FIG. 2 illustrates exemplary pseudo-code 200, according to one embodiment, for setting a traffic light status based on an apply lag prediction. Exemplary computing systems that may implement a migration include any one or more of a large-scale cloud-based computing system, a system with multiple datacenters, multitenant data service systems (see, e.g., FIG. 1 discussion), web-based systems, systems that support massive volumes of concurrent and/or sequential transactions and interactions, database systems, etc. Various system constituents as described elsewhere herein may be implemented through software, hardware, or a combination of software and hardware. Any, some or all of these system elements may be interconnected and communicate directly or indirectly over one or more wired or wireless medium. Computing systems hosting organizations may use datacenters located anywhere worldwide and/or off-world, e.g., in a satellite or other orbiting device.

Performing a migration may interfere with operation of other database operations and/or services, such as the Data Guard service. In various embodiments, a traffic light may be based at least in part on a predicted Data Guard apply lag. The predicted lag may be based on past and/or current apply lags may be used to assist with setting the traffic light status. As discussed above, when migrating a first primary database to a second primary database, the migration may affect the Data Guard service of, for example, the second primary database. As illustrated, a test may be made to determine if 202 a Data Guard apply lag 204 exceeds a Data Guard Threshold 206. In one embodiment, the apply lag refers to the lag time in performing replication of a primary database to a standby database. The threshold may be any value that may be set as a function of a Service Level Agreement (SLA) to ensure SLA bounds are kept, dynamically responsive to operations and/or characteristics of the primary database and/or the source system, as well as manually based on experimentation or other source for the threshold value.

If 202 the threshold is exceeded, then an Apply Rate 208 and a Redo Rate 210 may be calculated. In the illustrated embodiment, the Apply Rate is the average apply rate over a first 212 time period, and the Redo Rate is the redo generation rate over a second 214 time period. It will be appreciated the first and second time periods may have values dependent on what makes sense for the use environment and/or type of data processed. The first and second time periods may be set to measure long and short times to assist with predicting trends. For example, the first time period may be set to the apply rate (e.g., how quickly is redo data being applied to the Standby Database) over the last hour, while the second time period may be set to the redo rate (how quickly is the redo data being generated, the redo data describing what to do to update the standby database) over the last minute.

Let's assume the lag threshold 206 is set to a value, such as a value less than a SLA. If, for example, there is an SLA of an hour, we can (arbitrarily) assign a lower value, such as 30 minutes. Thus, in the illustrated example, in the context of the Data Guard Apply Lag 204 exceeding the Lag Threshold 206, then we update the traffic light throttling migration. If 216 the Apply Rate 208 over the last hour is less than 218 the Redo Rate 210 over the last minute, then the stop light will return RED 220 (stop). As discussed above, migration may be configured to dynamically throttle its activity based on the status of the stop light. In the illustrated embodiment, if 216 the Apply Rate is not less than the Redo Rate, then generating redo data is not predicted to be outpacing application of the redo data, and the traffic light may return GREEN 222 (continue at full speed). It will be appreciated there may be multiple thresholds to generate stop light values beyond RED and GREEN, e.g., YELLOW (slow down), or, moving away from the traffic light context, simply using N levels of thresholds to provide granularity in throttling activity if and as needed. Use of the traffic light will cause data moving during the migration to slow down and/or stop, to allow the Data Guard to perform better.

It will be appreciated measuring Apply Lag is only one of many possible metrics to use to determine the effect a migration has on performance of, for example, the target system, the source system, migration application servers, database activity, or software and/or machines. While the illustrated pseudo-code provides for adjusting the speed of migration data movement, Data Guard apply lag may nonetheless appear to continue to rise. There can be many reasons for this. One reason is apply lag simply measures time since Data Guard's last unapplied change, and makes no attempt to quantify how many changes are left to be applied. Experience has shown, for example, Data Guard may sometimes require about three minutes to apply one minute of redo data. This means even if the traffic light is RED, and migration data is slowing or stopped, apply lag can continue to rise until the Data Guard system catches up. It will be appreciated indicated times are exemplary and are dependent on the hardware and/or software configuration in a particular environment.

A traffic light applying the logic of the illustrated pseudo-code may predict an apply lag trend and set the traffic light value accordingly to dynamically throttle a migration. In some embodiments, an Apply Lag associated with either the first and/or second primary database, may be predicted and used in setting the traffic light status.

Figure 3:
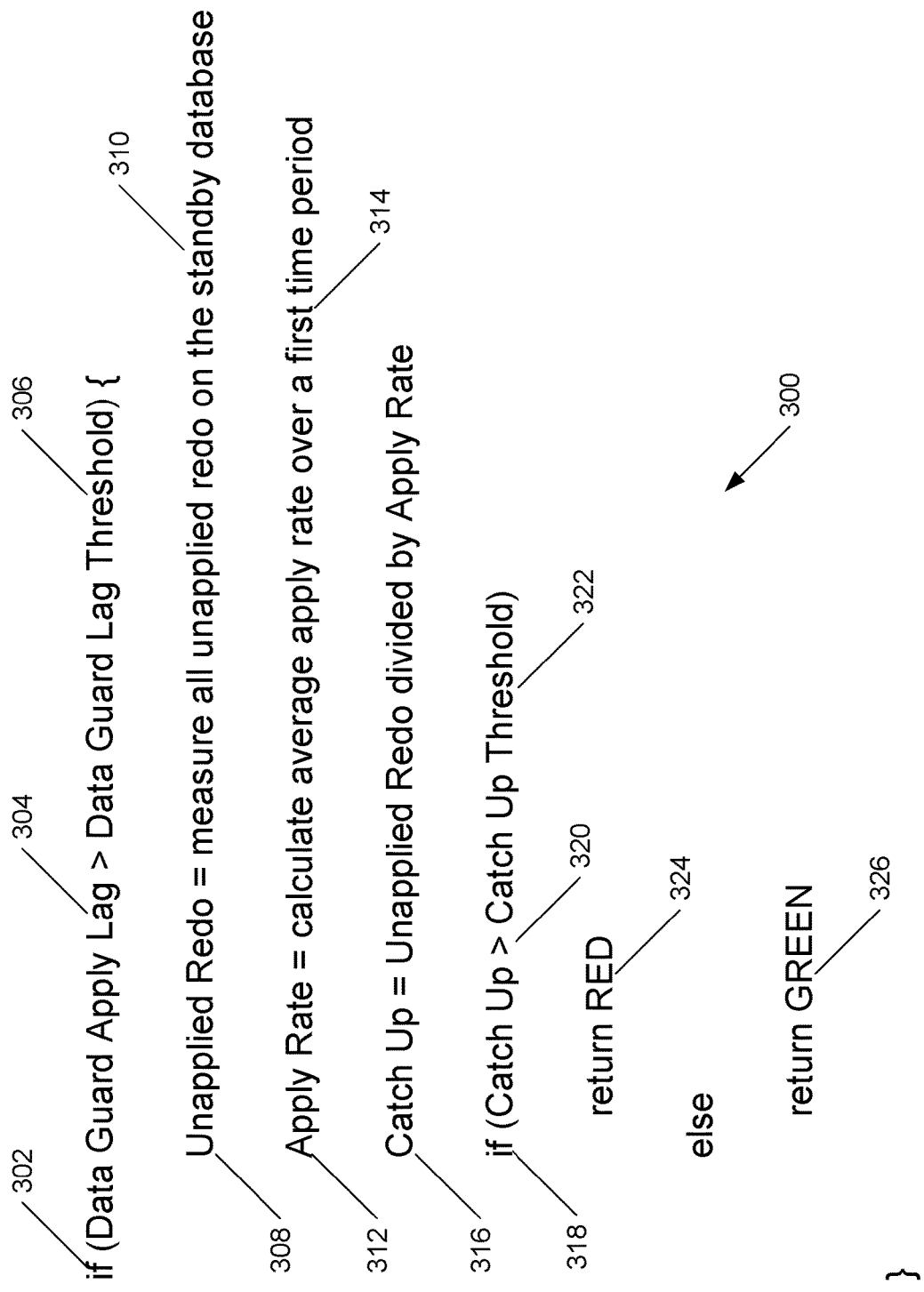
FIG. 3 illustrates exemplary pseudo-code according to one embodiment.

FIG. 3 illustrates exemplary pseudo-code 300, according to one embodiment, for setting a traffic light status based on an estimated catch-up time to complete applying redo data to a standby database. As discussed above, migration (or other operations/services) may interfere with operation of other database operations and/or services, such as the Data Guard service. In various embodiments, a traffic light may be based at least in part on the predicted Data Guard catch-up time.

As discussed above, migrating a first primary database to a second primary database may, for example, affect the Data Guard service operating on the second primary database. As illustrated, a test may be made to determine if 302 a Data Guard apply lag 304 exceeds a Data Guard Threshold 306. In one embodiment, instead of monitoring the apply lag as in FIG. 2, instead we could use a stop light based at least in part on monitoring Data Guard activity to predict a "Catch Up Time." This prediction may be applied instead of, or in addition to, the apply lag monitoring of FIG. 2. Using a catch-up prediction may be useful, for example, in the event of a site switch where apply lag may not be an accurate measure of how long of a wait is needed before the site may switch over without risking data loss. A catch-up prediction metric will be used to predict completion time for applying queued but not yet applied redo data. The predicted time to catch up may be used to represent when a switch may safely occur.

In one embodiment, using the catch up prediction, if 302 the Data Guard Apply Lag 304 exceeds the Data Guard Lag Threshold 306, indicating, for example, the start of a period of high redo generation, redo data generation throttling may begin when predicted catch up time exceeds a threshold. This is likely to occur sooner than when apply lag prediction would pass the same threshold, and the threshold will also be a bounding value for the apply lag when redo generation roughly matches apply rate. In the illustrated embodiment, an Unapplied Redo 308 is determined as a measure of all unapplied redo currently pending for the standby database 310. It will be appreciated while it is presumed we are concerned with the Data Guard Service operating on the second primary database (in the target system instance/in a different POD), in other embodiments, not illustrated, the Unapplied Redo may measure redo operations for other Data Guard services on other databases and/or measure other activity, resources, and/or operations, etc. that may impact performance of applying redo and hence may incorporated into the Unapplied Redo metric.

An Apply Rate 312 is determined as a measure/calculation of an average apply rate that has occurred over a first 314 time period. As discussed above with respect to FIG. 2, time periods may be manually and/or automatically selected based on experience, performance analysis, and/or in conjunction with AI analysis. A Catch Up 316 time may then be determined as a ratio of the Unapplied Redo divided by the Apply Rate. The Catch Up time indicates how much time is required to complete application of the redo data if redo data generation stopped. If 318 the Catch Up time exceeds 320 a Catch Up Threshold 322, then the stop light is assigned a status. For simplicity, in the illustrated embodiment, if the threshold is exceeded, then the light returns RED 324, which as discussed above results in throttling the migration that is affecting the Data Guard service. If the threshold is not exceeded then the stop light returns GREEN 326.

The stop light need not be limited to two states, e.g., RED or GREEN. As discussed above, the traffic light could use N levels of thresholds for its status to allow for progressive throttling as needed. In this catch up predictive pseudo-code, if the first 314 time period is an hour as used above in the FIG. 2 apply lag predictive pseudo-code, one may estimate how quickly Data Guard can catch up once redo data generation stops. That is, while the apply lag prediction may indicate an hour (measuring since last applied redo data), the catch up prediction may reveal there are few operations left and the catch up time is actually much shorter, e.g., minutes needed to catch up. Thus the apply lag prediction may suggest the traffic light needs to be RED, where catch up prediction instead shows operations are proceeding well and a GREEN (or in-between YELLOW or other Nth level) status may instead be returned.

Conversely, it will be appreciated the apply lag prediction may suggest operations are going well, e.g., one would predict a 30 minute lag, but the catch up prediction indicates many redo operations are left to apply, and hence the effective time left may be much longer than predicted from the FIG. 2 apply lag, e.g., two hours instead of 30 minutes. In this situation the apply lag prediction may suggest a GREEN light, but the catch up prediction may suggest a YELLOW or RED light depending on the amount of redo to perform. In such a situation it will be appreciated throttling sooner than apply lag prediction suggests may provide for steady processing since slowing down migration may ultimately allow more data throughput than would a stop-and-start approach as may occur during the migration. It will be appreciated indicated times within this document are exemplary and dependent on hardware and/or software configurations for particular environments.

It will be appreciated both the FIG. 2 apply lag prediction and FIG. 3 catch up prediction may be used if and as needed. In various embodiments, migration traffic from the source system instance to the target system instance may be slowed or eliminated based on the prediction(s) utilized and thus, flow control techniques may be adaptive to real-time or near real-time traffic and/or resource utilization on one or both of the source and/or target system instances to try to maximize throughput while maintaining healthy operational states of the source and target systems.

Figure 4:
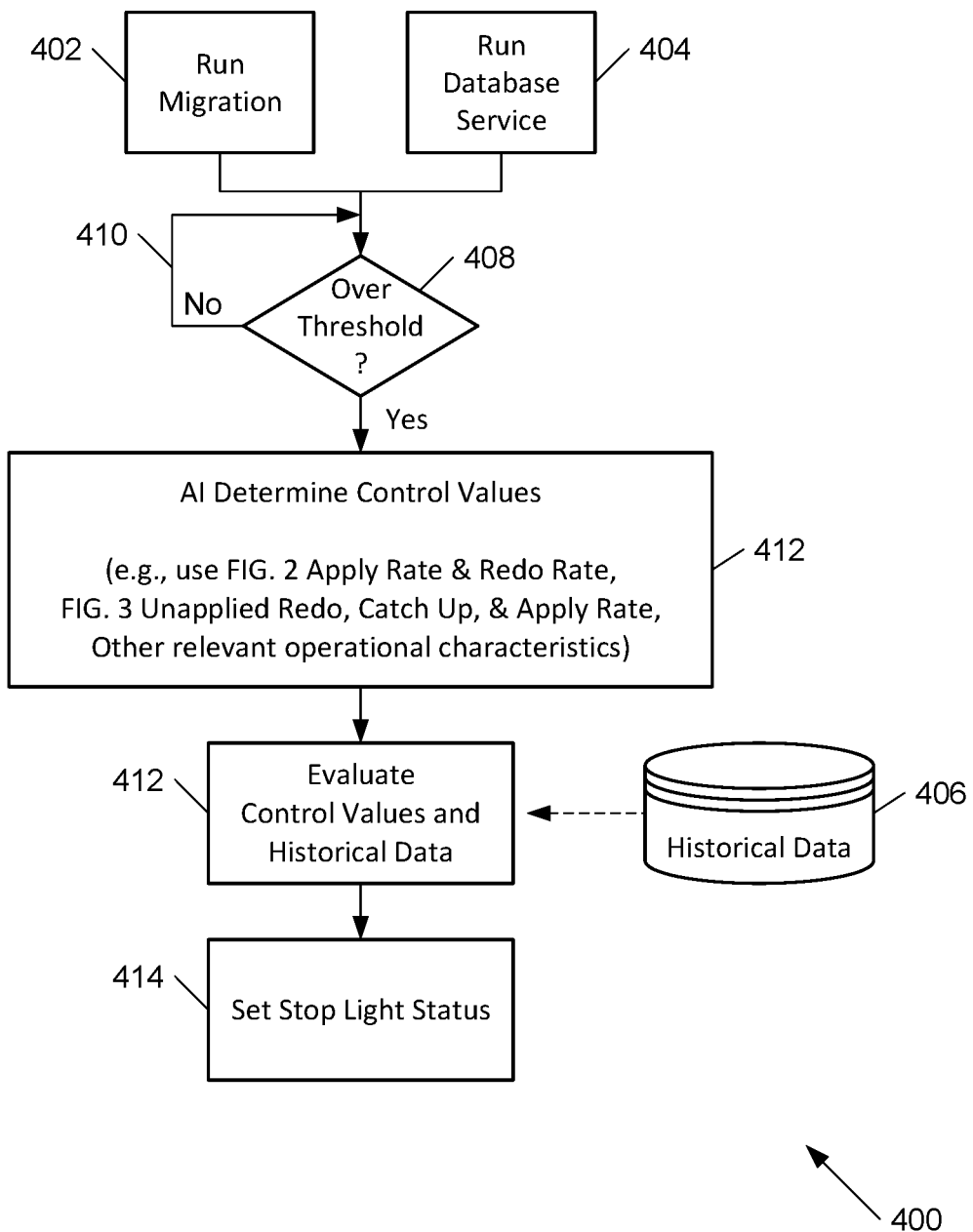
FIG. 4 illustrates a flowchart according to one embodiment.

FIG. 4 illustrates a flowchart according to one embodiment. In this embodiment, an Artificial Intelligence (AI) may be applied to assist in the traffic light status decision-making presented in the FIG. 2 and FIG. 3 discussion. In this embodiment, it is assumed a migration 402 is running, as well as another Database Service 404 which for convenience will be assumed to be Data Guard as discussed above, but may be any other database service and/or operation that may be disrupted by performing an operation such as the migration.

It will be appreciated the AI may integrated within a database environment/in a cloud computing environment, such as is the AI engine "Einstein" by salesforce.com, Inc.) that can be used to provide analytics service(s) such as AI-driven answers, explanations, sentiment, recommendations, and predictions to one or more service(s) within of the database environment. In some embodiments, the AI engine is coupled with the database environment, e.g., a DBMS, and may use the data stored in the database, including historical data 406 relating to the effectiveness of using the FIG. 2 and FIG. 3 prediction mechanisms to throttle the migration 402. Unlike the FIG. 2 and FIG. 3 embodiments, AI technologies may provide, for example, predictive forecasting and recommendations based on past experience with different circumstances, e.g., relative to a particular POD environment, relative to particular activity (such as Data Guard) on a source and/or destination instance, and use the past experience to determine a value to assign to a traffic light status.

While operations of interest, e.g., migration 402, database service 404 (for example, Data Guard) are running, a test may be made to determine if 408 a threshold has been exceeded. The threshold is not specified as it is dependent on the database service being evaluated. If we assume the Data Guard database service, the threshold would be the Data Guard Lag Threshold discussed above. If not 410 then for the purposes of this diagram, processing loops back to re-test. It will be appreciated in a database environment, processing would move on in parallel to perform other tasks while awaiting the test result to change. If 408 the threshold has been exceeded, then we determine control values 412. The control values represent information that should be accessed in order to set the traffic light status. Thus for example, the AI may determine current control values, such as in FIG. 2 (Apply Rate and Redo Rate), or as in FIG. 3 (Unapplied Redo, Catch Up and Apply Rate), or determine other values as needed depending on the database service 404 being evaluated.

The AI may take in as further input Historical Data stored in a database 406, It will be appreciated the historical data may include past control values, past statistics relating to operation of the Data Guard or other services, past times required to complete a migration when the other database service 404 is or is not running, data transfer statistics, etc. With this information the AI may make a more complete totality of the current circumstance prediction and this evaluation may be used to set 414 the stop light status.

Figure 5:
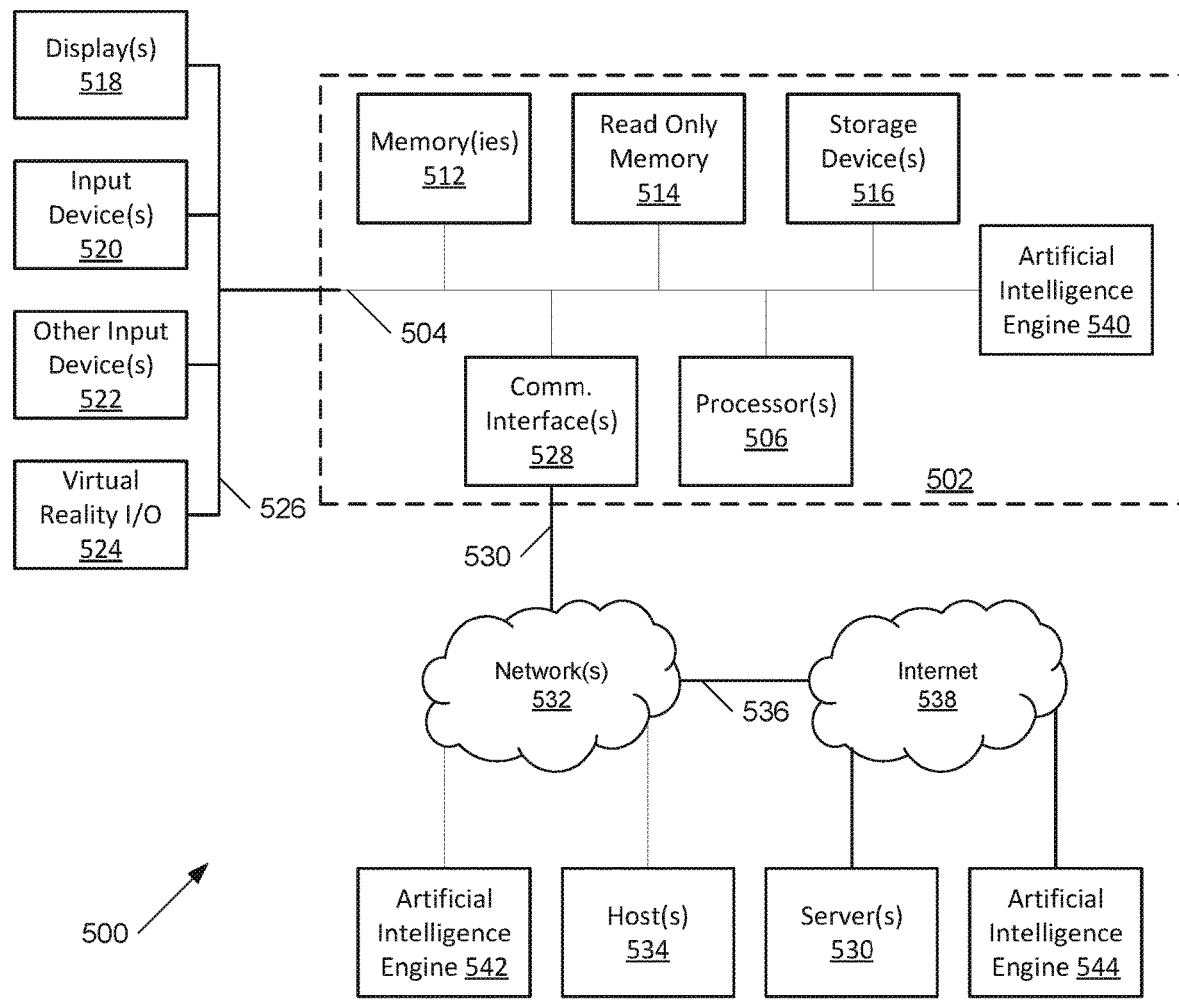
FIG. 5 illustrates an exemplary hardware environment according to one embodiment.

FIG. 5 illustrates an exemplary hardware environment 500 according to one embodiment. Disclosed herein are systems, methods, procedures, processes and the like that may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, telephones, tablets, transportation devices, or any other device that incorporates hard-wired and/or program logic to implement the techniques.

For example, illustrated is a computer system 502 upon which embodiments or portions of embodiments of the invention may be implemented. The computer system includes a bus 504 or other mechanism for communicating information within the computer system, and one or more processor(s) 506 coupled with the bus for processing information. The processor(s) may be, for example, a general purpose microprocessor, a custom processor, or other processor or collection of processors. It will be appreciated multiple processors may operate collectively as if as a single processor. Although the processor(s) are shown as all within the computer system, there may be other processors accessible over another bus (not shown), such as by way of an attached external enclosure containing processors. Additionally, information execution may be distributed across multiple processors accessible over one or more network(s) 508, e.g., internal networks within an environment including the computer system, and/or over the Internet 510.

The computer system 502 also includes a memory 512, e.g., a main memory, such as a random access memory (RAM) or other dynamic storage device, coupled to the bus 504 for storing information and instructions to be executed by the processor(s) 506. The main memory may also be used for storing temporary variables or other intermediate information during execution of instructions to be executed by the processor(s). Such instructions, when stored in non-transitory storage media accessible to the processor(s), render the computer system into a special-purpose machine that is device-specific to perform the operations specified in the instructions. The computer system may further include a read only memory (ROM) 514 or other static or non-volatile storage device coupled to the bus 504 for storing information or instructions for the processor(s). A storage device or devices 516, such as a magnetic disk, optical disk, or other storage media may be provided and coupled to the bus for storing information and instructions.

The computer system 502 may be coupled via the bus 504 to one or more output device(s), e.g., display(s) 518, such as a liquid crystal display (LCD), for displaying information to a computer user. There may also be input devices 520, including alphanumeric and/or other keys, coupled to the bus for communicating information and command selections to the processor(s) 506. There may be other input devices 522, such as a mouse/tablet/trackball/cursor direction keys/or other sensors including biometric devices to translate biometric information into input, for communicating direction information and command selections to the processor(s), and which may control, for example, cursor movement on the display(s). There may also be Virtual Reality Input/Output (I/O) 524 devices that may be used in addition to or in lieu of the other devices 518-522. It will be appreciated Virtual Reality may operate both as a display of information relating to operation of the computer system, and also provide 2D and 3D input mechanisms (e.g., through movement of wands or other devices the virtual reality system monitors, as well as by visual monitoring and analysis of use movement, such as gesturing). The input and output devices 518-524 may communicate with the computer system over one or more communication pathways 526 that may interconnect these devices with the computer system.

The computer system 502 may implement the techniques described herein using device-specific hard-wired logic, one or more ASICs or FPGAs, firmware and/or program logic which in combination with the computer system causes or programs the computer system to be a special-purpose machine. According to one embodiment, the techniques herein are performed by the computer system in response to the processor(s) 506 executing one or more sequences of one or more instructions contained in the memory 512. Such instructions may be read into the memory from another storage medium, such as from the storage device(s) 516. Execution of the sequences of instructions contained in the memory causes the processor(s) to perform the process steps described herein. In alternative embodiments, hard-wired circuitry may be used in place of or in combination with software instructions.

Storage media refers to any at least partially non-transitory media that may store data and/or instructions that cause a machine to operation in a specific fashion. Non-volatile media includes, for example, solid state disks (SSDs), optical or magnetic disks, etc. and may be used at the storage device(s) 516. Volatile media includes dynamic memory, such as the memory 512. There are many known volatile and/or non-volatile media memory and media formats that may be used to provide temporary or permanent storage. Storage media may be used in conjunction with transmission media. Transmission media participates in transferring information between storage media. For example, transmission media includes wireless and wired mediums, including the bus 504, modulated signals, acoustic waves, or light waves, such as those generated during radio-wave and infra-red data communications.

Various forms of media may be involved in carrying one or more sequences of one or more instructions to the processor(s) 506 for execution. For example, the instructions may initially be carried on storage of a remote computer. Assuming a similar configuration as the computer system 502, the remote computer can load the instructions into its memory and send the instructions over a communication pathway, which may be any form of wired or wireless communication medium. A corresponding receiving device local to the computer system may receive the data and convert the received information for placement on the bus 504. The bus may then carry the data to the memory 512, from which the processor(s) retrieves and executes the instructions. The instructions may be stored on the storage device(s) 516 before or after execution by the processor(s).

The computer system 502 includes a communication interface(s) 528 coupled to the bus 504. The communication interface(s) provides a two-way data communication coupling to a network 530 that is connected to a local network(s) 532. The communication interface(s) may include devices to communicate over a network such as by way of a local area network (LAN) or other network to provide a data communication connection for the computer system. Wireless links may be utilized. The communication interface(s) sends and receives signals in a format appropriate to the communication medium (e.g., electrical, electromagnetic, optical, etc.) that carry digital data streams representing various types of information. The communication interface(s) 528 allow a computer system to send and/or receive information through one or more network(s) to other data devices. For example, there may be a network link through the local network(s) to a host computer 534. There may be a link 536 that interconnects the local network(s) with the Internet 538, through which the computer system may communicate with another machine, such as one or more remote server(s) 540 which may send or receive requests to process data, retrieve and/or store information, etc.

In addition, as discussed with respect to FIG. 4, various embodiments may employ Artificial Intelligence (AI) Engines (or "machine intelligence") to assist with determining a likely-effective traffic light status. It will be appreciated that there are many different AI Engines that may be employed, such as neural networks (feedforward, recurrent, backpropagation, deep learning, etc.), expert systems, and many other analytical systems. It will be appreciated an AI Engine 540 may be incorporated into the computer system 502. However, since a robust AI Engine may require robust resources unavailable to certain computers, and AI Engine

542 may be available over a local network(s) 532 and/or an AI Engine 544 may be available as a remote resource accessible over, for example, the Internet 538. It will be appreciated that one or more of the AI Engines 540-544 may cooperatively operate to analyze problems and suggest answers. In the context of a migration, an AI Engine may help both the source and destination to efficiently and effectively maintain the migration while minimizing impact to other ongoing activity such as Data Guard services.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system for managing a first primary database, a second primary database, and a standby database, comprising: a processor; and memory coupled to the processor and storing instructions that, when executed by the processor, cause the database system to perform operations comprising:
   monitor an activity of the first primary database;
   migrate a portion of the first primary database to the second primary database;
   determine redo data corresponding to the activity, wherein the redo data has an associated redo rate associated with how quickly redo data is determined;
   replicate the activity of the first primary database in the standby database based at least in part on the redo data; wherein the replicated activity in the standby database has an associated number of operations still to be performed to replicate the activity in the standby database;
   determine a catch-up time prediction metric for applying the redo data to the standby database based at least in part on the number of operations still to be performed to replicate the activity;
   determine an apply rate based at least in part on the applying the redo data to the standby database;
   predict a potential apply lag based at least in part on the catch-up time and whether the apply rate is less than the redo rate;
   set a status for a traffic light based at least in part on the predicted potential apply lag; and
   dynamically throttle the migration of the portion of the first primary database to the second primary database based at least in part on the traffic light.

2. The database system of claim 1, wherein:
   the catch-up time corresponds to a dynamic estimate of time to complete the number of operations.

3. The database system of claim 1, the instructions further including instructions to cause the database to perform operations further comprising:
   determine the catch-up time exceeds a threshold;
   determine an average apply rate over a first time period; and
   determine a redo generation rate over a second time period.

4. The database system of claim 3, in which the instructions to throttle the migration of the portion includes instructions to dynamically adjust the migration of the portion based at least based in part on the status of the traffic light, the instructions further including instructions to cause the database to perform operations further comprising:
   compare the apply rate to the redo rate; and
   set the status of the traffic light based at least in part on the comparing.

5. The database system of claim 4, wherein the status includes a number of throttle states corresponding to different amounts of throttling the migration.

6. The database system of claim 4, the instructions further including instructions to cause the database to perform operations further comprising:
   determine a sequence of operations corresponding to the migration of the portion of the first primary database to the second primary database; and
   scale a performance of the sequence of operations based on the traffic light.

7. The database system of claim 4, the instructions further including instructions to cause the database to perform operations further comprising:
   determine a sequence of operations corresponding to the activity of the first primary database; and
   scale execution of the sequence of operations based at least in part on the traffic light.

8. The database system of claim 1, the instructions further including instructions to cause the database to perform operations further comprising:
   determine an average apply rate over a first time period;
   determine a redo generation rate over a second time period;
   set the traffic light status based at least in part on whether an average apply rate over the first time period is less than an average redo generation rate over the second time period; and
   scale, based at least in part on the status, a selected one or more of:
      the migration of the portion of the first primary database to the second primary database, or
      the activity of the first primary database.

9. The database system of claim 1, the instructions further including instructions to cause the database to perform operations further comprising:
   determine an apply lag trend during the migration of the portion of the first primary database to the second primary database;
   compare the catch-up time to the apply lag trend;
   set the traffic light status based at least in part on the comparison between the apply lag trend and the catch-up time; and
   scale, based at least in part on the status, the migration of the portion of the first primary database to the second primary database.

10. The system of claim 1, in which the first primary database is to store data for multiple organizations, and wherein the migration of the portion of the first primary database to the second primary database comprises migration of data associated with a selected organization of the multiple organizations.

11. A method for managing a first primary database, a second primary database, and a standby database, comprising:
   monitoring an activity of a selected one or more of: the first primary database, the second primary database, or a logical database corresponding to selected portions of multiple databases;
   migrating a portion of the first primary database to the second primary database;
   determining redo data corresponding to the activity, wherein the redo data has an associated redo rate associated with how quickly redo data is determined;
   replicating the activity to the standby database based at least in part on the redo data, wherein the replicating has an associated number of operations still to be performed to replicate the activity in the standby database;
   determining a catch-up time prediction metric for applying the redo data to the standby database based at least in part on the number of operations still to be performed to replicate the activity;
   determining an apply rate based at least in part on the applying the redo data to the standby database;
   predicting a potential apply lag based at least in part on the catch-up time and whether the apply rate is less than the redo rate;
   setting a status for a traffic light based at least in part on the predicted potential apply lag; and
   dynamically throttling the migrating the portion based at least in part on the traffic light.

12. The method of claim 11, wherein the catch-up time corresponds to a dynamic estimate of time to complete the number of operations.

13. The method of claim 11, further comprising:
   determining there is an actual apply lag; and
   evaluating if the catch-up time exceeds a threshold, and if so, setting the status for the traffic light based at least in part on the actual apply lag and the catch-up time.

14. The method of claim 13, wherein the dynamically throttling the migrating comprises:
   determining a sequence of operations corresponding to the migrating the portion of the first primary database to the second primary database; and
   scaling a performance of the sequence of operations based on the traffic light.

15. The method of claim 13, further comprising determining a sequence of operations corresponding to the activity of the first primary database, and dynamically scaling a performance of the sequence of operations based at least in part on the traffic light.

16. The method of claim 11, further comprising:
   determining an apply lag trend during the migration of the portion of the first primary database to the second primary database;
   comparing the catch-up time to the apply lag trend;
   setting the status of the traffic light based at least in part on the comparison between the apply lag trend and the catch-up time; and
   dynamically scaling, responsive to at least the status, a selected one or more of:
      the migrating the portion of the first primary database to the second primary database, or
      the activity of the first primary database.

17. A computer readable memory having instructions stored thereon for managing a first primary database, a second primary database, and a standby database, that, in response to execution by a processor, are operable to perform operations including:
   monitor an activity of a selected one or more of: the first primary database, or the second primary database;
   migrate a portion of the first primary database to the second primary database;
   determine redo data corresponding to the activity, wherein the redo data has an associated redo rate associated with how quickly redo data is determined;
   replicate the activity to the standby database based at least in part on the redo data, wherein the replicating has an associated number of operations still to be performed to replicate the activity in the standby database;

determine a catch-up time prediction metric for applying the redo data to the standby database based at least in part on the number of operations still to be performed to replicate the activity;
determine an apply rate based at least in part on the applying the redo data to the standby database;
predict a potential apply lag based at least in part on the catch-up time and whether the apply rate is less than the redo rate;
set a status for a traffic light based at least in part on the predicted potential apply lag; and
dynamically throttle the migration of the portion based at least in part on the traffic light.

18. The computer readable memory of claim 17, wherein the catch-up time corresponds to an estimate of time to complete the number of operations, the instructions including further instructions that are operable to perform operations that further comprise:
evaluate if the catch-up time exceeds a threshold, and if so, set the status for the traffic light based on a comparison between the apply rate and the redo rate; and
dynamically throttle the migration of the portion responsive to the status.

19. The computer readable memory of claim 18, wherein the operations further comprise:
determine a sequence of operations corresponding to the migration of the portion of the first primary database to the second primary database; and
scale performance of the sequence of operations based on the traffic light.

20. The computer readable memory of claim 17, wherein the operations further comprise:
determine an apply lag trend during the migration of the portion of the first primary database to the second primary database;
compare the catch-up time to the apply lag trend;
set the status of the traffic light based at least in part on the comparison between the apply lag trend and the catch-up time; and
dynamically scale, responsive to at least the status, a selected one or more of:
the migration of the portion of the first primary database to the second primary database, or
the activity of fire first primary database.

* * * * *